Jan. 12, 1965 S. H. CUSHNER 3,165,749
MICROWAVE TRANSMISSIVE OPTICAL RADIATION REFLECTORS
Filed Sept. 15, 1958 3 Sheets-Sheet 1

STANTON H. CUSHNER
INVENTOR.
BY
ATTORNEYS

Jan. 12, 1965 S. H. CUSHNER 3,165,749
MICROWAVE TRANSMISSIVE OPTICAL RADIATION REFLECTORS
Filed Sept. 15, 1958 3 Sheets-Sheet 2

STANTON H. CUSHNER
INVENTOR.
BY
ATTORNEYS

Jan. 12, 1965 S. H. CUSHNER 3,165,749
MICROWAVE TRANSMISSIVE OPTICAL RADIATION REFLECTORS
Filed Sept. 15, 1958 3 Sheets-Sheet 3

STANTON H. CUSHNER
INVENTOR.

BY
ATTORNEYS

United States Patent Office 3,165,749
Patented Jan. 12, 1965

3,165,749
MICROWAVE TRANSMISSIVE OPTICAL
RADIATION REFLECTORS
Stanton H. Cushner, Los Angeles, Calif., assignor, by mesne assignments, to Thompson Ramo Wooldridge Inc., Cleveland, Ohio, a corporation of Ohio
Filed Sept. 15, 1958, Ser. No. 760,944
9 Claims. (Cl. 343—911)

This invention relates to improvements in wavelength selective optical components and systems and more particularly to improved optical radiation reflectors which are microwave transmissive. Such reflectors are especially suited for use in electromagnetic wave systems which simultaneously or alternatively employ microwave radiation and infrared or other short wavelength optical radiation.

This invention is especially applicable to systems for the detection of distant objects, such as enemy aircraft. It is well known that such distant objects can be detected by means of infrared detection systems and also by means of radar.

In an infrared detecting system, infrared radiation emitted from the object is employed to determine the direction in which the object lies with reference to the detecting system. This may be done in several ways. In one such system, the infrared radiation emitted from different points of an object field is detected and is employed to form an infrared image of the object field. In such a system, separate objects which are emitting either a very large or a very small amount of infrared radiation as compared with the background of the object field produce discrete discernible images.

In a radar system on the other hand, a combined transmitter and receiver unit of microwave radiation is frequently employed to detect an object and to measure its distance from the radar unit. Radar systems are also employed to determine the direction to the object. In most radar systems, bursts or pulses of energy of high intensity are periodically emitted in a predetermined direction from the radar unit and subsequently the same energy is detected at the radar unit after reflection from an object lying along the path of transmission of the energy burst. In such systems it is conventional to employ suitable means for measuring the time required for the burst to travel from the radar unit to the object and then by reflection back to the radar unit. This time measurement is a measure of the distance to the object.

It has been found that infrared detecting systems are sensitive up to long distances to fifty to one hundred miles. While radar systems are also effective up to such distances, it is desirable to employ them only over ranges such as twenty miles and for only short periods of time so as to reduce the possibility of their being detected and jammed by an enemy.

An infrared detection system is particularly advantageous in determining the angular position of an object relative to a fixed axis. On the other hand, a radar system is incapable of achieving the high accuracy of angular measurement as that attainable with an infrared detecting system. However, most known forms of infrared detecting systems are unsuitable for determining the distance to an object unless a binocular arrangement is employed. On the other hand, a radar system is capable of extreme accuracy in determining the distance to an object.

For the foregoing and other reasons, it is therefore very desirable to provide a combined system which will take advantage of the high angular resolving power of an infrared detecting system and the high accuracy of a radar system in determining distance or range. For example, it is desirable to employ both types of systems in the nose of a guided missile to enable the missile to be accurately and reliably guided both at long distances from a target at short distances therefrom.

The idea of combining both infrared detecting systems and radar detecting systems in guided missiles or in airplanes either for object-detection or for guidance purposes has often been considered in the past, but such an idea has been rejected as being impractical for numerous reasons. One objection to the use of a system combining both infrared detection and radar principles has involved the fact that it has generally been considered necessary to employ separate units. This, of course, would make it difficult to install both units where the installation must be made either in the nose or in the tail of the missile or aircraft in question. The idea of combining the two units in one unit has also been rejected because of the need to provide a window which is transparent both to microwave energy and to infrared radiation. For example, generally speaking, where windows are needed in radar systems, polystyrene has been employed as a window material. Polystyrene has a very high absorption coefficient for infrared radiation and hence is unsuitable as a window for this type of radiation. Another objection to combining the two units lies in the difficulty of separately detecting the microwave radiation from the infrared radiation. Another difficulty resides in the fact that microwave energy tends to affect some infrared detecting systems adversely. The advantageous concept of using a combined infrared-microwave tracking or detection system, although not per se a new idea, is made feasible by the present invention in that the invention provides improved techniques and devices for separating and selectively detecting that portion of the impinging radiation which lies within the optical frequency wavelength ranges. As used herein the term "optical radiation" is intended to mean and encompass electromagnetic waves having wavelengths such that the waves are generally regarded as responsive to the classical rules of optical physics as contrasted to the theory and rules of radio wave and microwave propagation.

Accordingly, one object of the invention is to provide a compact and efficient object detecting system which employs both infrared radiation and microwave radiation in locating distant objects, and in which some optical elements are used in common for focusing both infrared and microwave energy but in which the infrared detecting element and the microwave detecting element are located at different points.

Another object of the invention is to provide a novel form of mirror useful in such a system which will selectively transmit microwave radiation and selectively reflect infrared radiation.

The foregoing and other objects of the invention, together with various advantages thereof, will be apparent from the following description taken in connection with the accompanying drawings in which.

In this application, the terms infrared radiation and microwave radiation describe radiation which are produced in entirely different ways and are of widely different wavelengths. The term infrared radiation applies to radiation which is of the order of about 1 to 15μ. Such infrared radiation occurs in large amounts in the hot exhaust outlets of aircraft. The term microwave radiation applies to radio waves which are genrated by resonating units associated with electrical or electromagnetic circuits. Such wavelengths may be of the order of three centimeters or so. As will appear hereinafter, this invention is particularly suitable for use with microwave radiation and short wavelength radiation for which the wavelength ratio is at least about 100 to 500.

Figure 1:
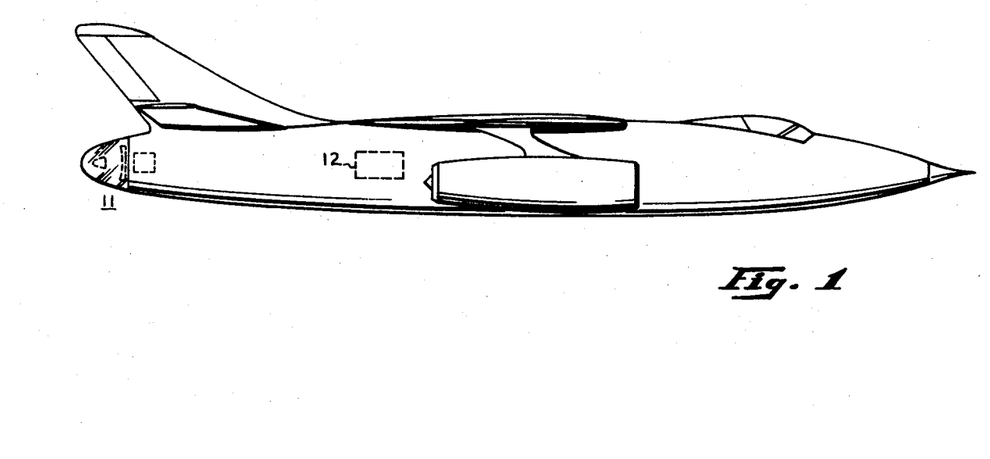
FIG. 1 is a diagrammatic view of an airplane employing this invention in the tail position.
Figure 2:
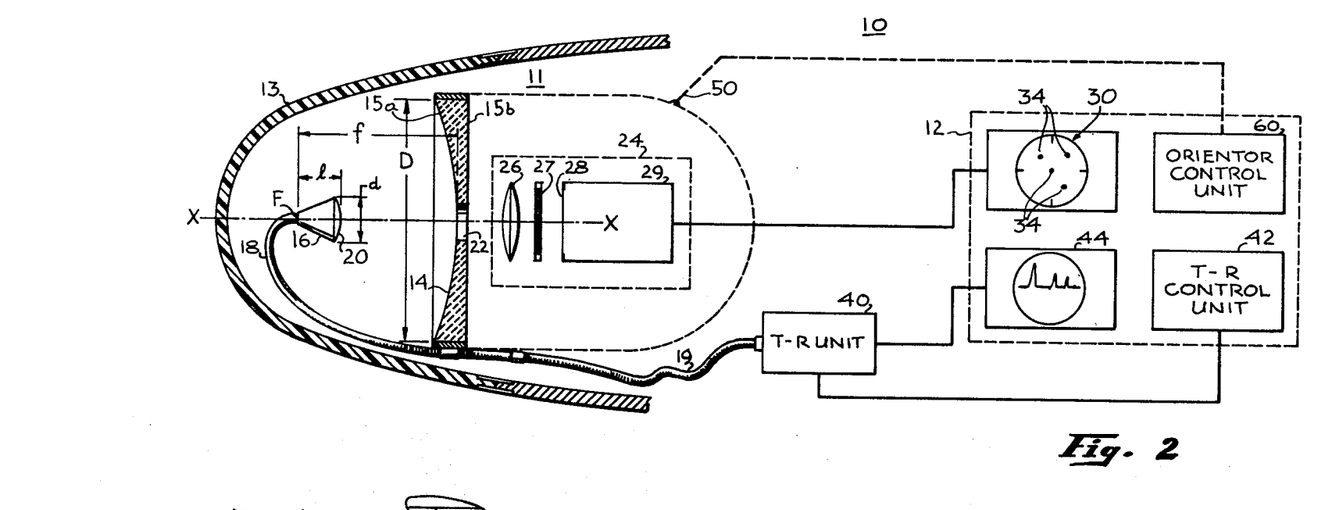
FIG. 2 is a schematic and block diagram showing a system embodying this invention.

In FIGS. 1 and 2 there is illustrated schematically an airplane incorporating a combined infrared and radar system 10 which may advantageously employ improved wavelength selective reflective elements in accordance with this invention.

The combined system includes an imaging unit 11, mounted in the trail of the aircraft, and a display unit 12, which is located in an observation or control room at some other point of the aircraft.

The imaging unit 11 includes a window 13 which is shaped to conform aerodynamically with the shape of the tail. As indicated, the window 13 may be of hemispherical configuration. A window having a diameter of about one and one-half feet is satisfactory with microwaves having a wavelength of 3 cm.

In accordance with conventional practice, this window 13 is made transparent to both the infrared radiation to be detected and the microwave radiation employed. The window may be composed, for example, of a single crystal of synthetic sapphire. Such a window is transparent to both microwave energy and infrared energy. Though somewhat less satisfactory, a window composed of fused quartz glass or Pyrex may be employed. For example, a fused quartz window having an actual thickness of about five millimeters is satisfactory for microwave wavelengths of the order of 3 cm.

In the combined imaging unit 11 show in FIG. 2, a rearwardly directed paraboloid reflector 14 is mounted transversely of the longitudinal axis X—X of the airplane. This paraboloid reflector acts as a radar-dish, and also as an infrared focusing mirror. The reflector 14 may be in the form of an aluminum mirror 15a, deposited on a glass base 15b, having a suitable paraboloid surface.

A conical horn 16 of rectangular cross-section forming the terminal of a wave-guide 18 is mounted at the focus of the reflector 14. The diameter $d$ of the horn and the length $l$ of the horn are at least several times as great as the wavelength of the microwaves employed. On the other hand, the focal length of the reflector 14, that is, the distance $f$ of the focal point F from the reflector 14 along the axis X—X and the diameter D of the reflector 14, is many times larger than the wavelength of the microwave radiation to be employed.

The reflector 14 possesses an optically smooth and accurately formed reflecting surface, so that infrared radiation can also be accurately focused. By an accurately formed surface is meant one in which the deviation of the surface from an accurate geometrical paraboloidal or other ideal focusing surface does not exceed more than about one-tenth of the wavelength of the radiation to be focused. By an optically smooth surface is meant one in which the deviation in height of the surface over very small distances from the average position of the surface over such distance does not exceed about one-tenth of the wavelength of the radiation to be reflected. The structural details of reflector 14 are not a primary feature of the present invention, and are now well understood by persons skilled in the art. One prior art paraboloidal mirror which satisfies the essential requirements is described in U.S. Patent 3,025,515 issued March 13, 1962 to A. F. Fairbanks.

The reflector 14 reflects both microwave radiation and infrared radiation toward the horn 16 and a mirror 20 is mounted across the entrance of the horn 16 to separate microwave radiation from infrared radiation. The mirror, which is of special construction as described more particularly hereinafter, is highly transparent to microwave radiation, but is highly reflective in the range of infrared radiation. For convenience, the mirror is referred to hereinafter as a dichroic mirror, since it separates radiation of two different wavelengths. However, this term is not to be construed literally, as the reflected and transmitted radiation in the visible range may be of the same color.

The structural details of the improved wavelength selective mirror 20, as described more particularly hereinafter, constitute a primary feature of the present invention.

The microwave energy being received along the line-of-sight of the reflector 14 is focused in the mouth of the horn 16. Similarly, microwave energy emitted by the horn 16 is reflected by the reflector 14 along the line-of-sight. The "image" containing microwave energy is not a sharp one, due to the large diffraction effects. However, it is important that the microwave energy that is reflected to the horn 16 be confined to a narrow space within the cross-sectional area of the horn. In any event, a well-defined virtual infrared image is formed in the region of the horn 16, and a real image of such character would be formed there except for the fact that the dichroic mirror 20 is employed in accordance with this invention to reflect infrared radiation forwardly along the axis X—X, and through an aperture 22 located at the center of the paraboloid mirror 14.

An optical system 24 cooperates with the hyperbolic dihcroic mirror 20 to form, at a position behind the reflector 14, a real infrared image of the field of view of the combined system. By way of example, the optical system 24 may employ a lens 26 for forming a real infrared image of the field of view in a plane 28, and an electrical camera 29, such as a television camera, may be employed with a closed circuit network to convert the infrared image formed at the plane 28 into a vsible image that is displayed on the face of a screen 30 of a cathode ray tube in the control room 12. A filter 27 may be located between the lens 26 and the image plane 28 in order to enhance the contrast in the image. More particularly, such a filter may be designed to pass radiation in a band of wavelengths in which the atmosphere is especially transparent, such as bands that lie in the interval between 2 and 5μ, and the interval between 8.5 and 13.5μ.

The wave-guide 18 is connected with a T–R radar unit, which is employed to generate bursts of microwave energy to be transmitted outwardly from the rear of the airplane, and to detect microwave energy reflected from an object located on the line-of-sight of the imaging unit 11 and to the rear. A control unit 42 located in the control room is employed to render the T–R operative at will, so that no microwave energy is radiated from the tail of the airplane except when the range of an object to the rear of the airplane is to be measured. The output of the T–R unit 40 is connected to a range indicating device such as an A-scope 44 located in the control room. A flexible waveguide section 19 is employed to permit angular movement of the imaging unit 11 as explained hereinafter.

With the arrangement described above, a visible image may be formed on a screen 30 which represents the distribution of infrared radiation in the field of view to the rear of the airplane. Thus, for example, images of a plurality of objects 34 that are emitting an excess of infrared radiation compared to the background may be depicted simultaneously on the screen 30. The relative positions of some of such images relative to the line-of-sight, and relative to each other, is apparent from the locations of these images on the screen. Such images may be formed while the control unit 42 is maintaining the T-R unit inoperative, so that no microwave radiation is emitted unnecessarily from the tail of the airplane. Occasionally, however, the control unit 42 is manipulated to render the T-R unit operative and thus to indicate on the range detector 44 the distance of an object that is to the rear of the airplane along the line-of-sight. The information thus obtained may be employed in the navigation of the airplane or in connection with the control of gunfire aimed at relatively close targets at the rear.

If desired, the entire imaging unit 11 may be mounted in a stationary position at the rear of the airplane. However, in a preferred embodiment of the invention, the reflector 14, the wave-guide 18 and horn 16 and the optical system 24 are mounted on a movable stabilized orientor 50, and the position of the orientor is controlled by means of an orientation control unit 60 located in the control room 12. With this arrangement, an observer, such as an electronic countermeasure officer stationed in the control room, can direct the line-of-sight of the imaging unit toward a specific object displayed on the screen 30 so as to permit range observation of that object by means of the radar unit. This operation may be accomplished, for example, by moving the orientor to such a position that the image of the object to be ranged appears at the center of the screen 30. It will also be understood that means may be provided which are controlled by an infrared detector and a radar unit for automatically tracking a selected object within the field of view. Likewise, if desired, suitable means may be provided for automatically wobbling the orientor so as to search the field of view for a target, and then to automatically select the nearest target for tracking.

Figure 3:
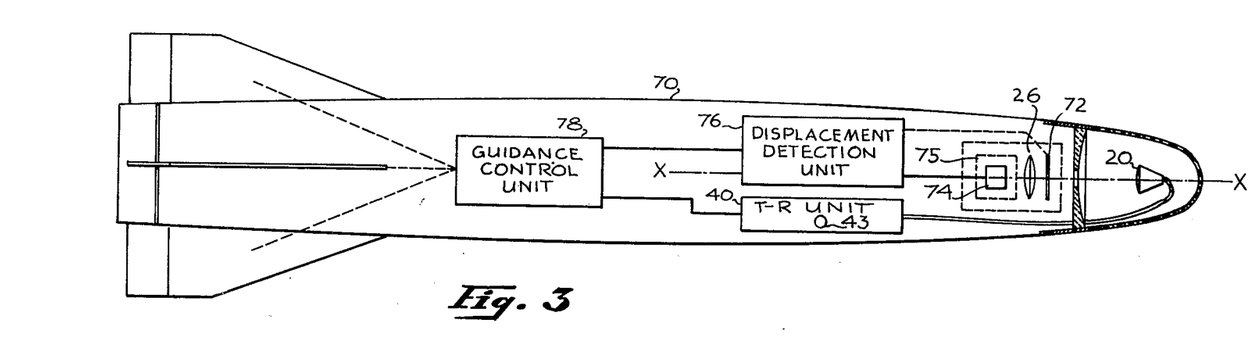
FIG. 3 is a schematic and block diagram showing another system embodying this invention.

In FIG. 3 there is shown schematically another environment in which the combined microwave and infrared system is employed in the nose of a guided missile 70. In this case a real infrared image of the field of view is formed in the plane of a rotating reticle 72 that is located in front of a refrigerated infrared detector 74, served by an integrating lens 26. The reticle 72 and the photo-detector 74 operate to apply a signal to a displacement measuring unit 76, which operates to indicate the angular displacement of an infrared object from the longitudinal axis X—X of the missile. The output of the displacement detecting unit and the T-R unit 40 are applied to a guidance control unit 78, which operates to guide the missile toward its target. Suitable means are provided to operate the T-R unit only after the missile has traveled to a position close to the target. Thus, for example, a timer 43 in the T-R unit may be set to render the T-R unit operative only after a predetermined amount of time has elapsed since launching of the missile.

In accordance with conventional practice the infrared detector 74 may comprise a lead selenide (PbSe) or lead telluride (PbTe) photosensitive surface and is conventionally cooled by a refrigerating element 75.

The environmental systems as generally described in the foregoing are representative of various prior art object detection and/or tracking apparatuses. The present invention relates, not to the concept of providing a combined infrared-microwave detection system, but rather to improvements in wavelength selective components of the type normally required by such systems. Thus, the foregoing systems have been described to provide a background understanding of the prior art systems from which the present invention proceeds. A more complete appreciation of various details of one such system may be had from a consideration of the aforementioned U.S. Patent Number 3,025,515.

Figure 4:
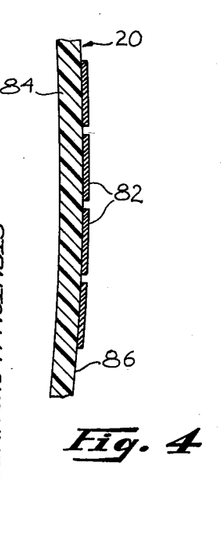
FIG. 4 is an enlarged fragmentary cross-sectional view of a dichroic mirror in accordance with the present invention.
Figure 5:
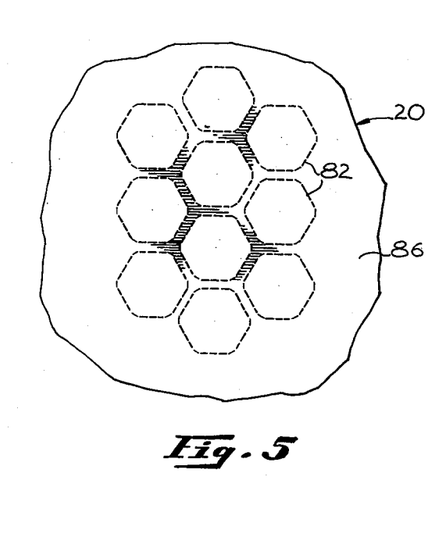
FIG. 5 is a rear view of the dichroic mirror.

The dichroic mirror 20 which is employed in accordance with the present invention is especially designed to be efficient in transmitting microwave energy and in reflecting infrared radiation or other short wavelength radiation that is to be detected. As illustrated in FIG. 4 and FIG. 5, the mirror 20 comprises a plurality of mutually insulated metallic mirror segments 82 firmly and intimately bonded to a base 84. In the embodiment illustrated, the base 84 is in the form of a hyperbolic dish of uniform thickness having an optically smooth surface 86 on the side thereof facing the parabolic mirror 14. It will be understood, however, that the base may, if desired, be formed in accordance with a variety of surfaces such as a plane, sphere, parabola, etc., to provide specialized optical characteristics. The base material may be composed of glass or quartz or any similar material that is transparent to microwave radiation and which possesses non-conductive dielectric characteristics. The mirror segments 82 are composed of any highly conductive material which has a high reflection coefficient in the infrared region. Such a material, for example, may be gold, aluminum, or an alloy of aluminum. The mirror segments are separated from each other by narrow gaps which are free of conductive material so that the mirror segments are mutually insulated from each other. The manner in which the mirror segments are formed is described below.

The sizes, shapes, and spacing between the mirror segments 82 are very important. In the specific mirror illustrated, the mirror segments 82 are in the form of regular hexagons. The corners of such hexagons are not nearly so sharp as the corners of triangular or square mirror segments would be. For this reason, the possibility of corona discharge at the corners of the mirror segments when the mirror is subjected to the influence of an intense microwave electric field is greatly reduced. The likelihood of such corona discharge occurring is also reduced further by rounding the corners slightly. In either event, the employment of mirror sectors which are of hexagonal configuration is superior.

Figure 6:
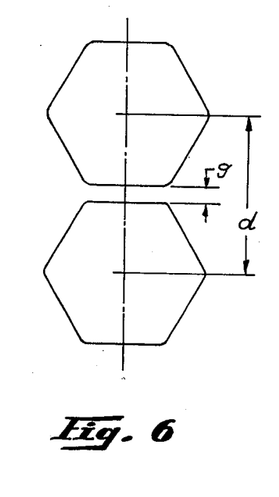
FIG. 6 is a geometrical diagram employed in explaining certain aspects of the invention.

Except for losses due to absorption by the mirror segments, the percentage reflection coefficient of a mirror composed of such segments is equal to the percentage of the surface that is coated by the mirror segments. To maintain a high infrared reflection coefficient, the magnitude of the gap space $g$ is maintained less than about one-tenth of the distance $d$ between centers of mirror segments as indicated in FIG. 6. To maintain a high degree of specular reflection relatively free from diffraction, the spacing $d$ between segments and the gap width $g$ are made large compared with the wavelength of the infrared radiation $\lambda_1$.

The percentage reflection coefficient of the mirror is given approximately by the formula $$R = 100\left[1 - 4\left(\frac{g^2}{d}\right)\right] \qquad (1)$$

It can be shown that in spite of the fact that the amount of open space between the mirror segments so formed is very small, the transmission coefficient T of microwave radiation can be made very high. More particularly, it can be shown that the percentage of microwave energy transmitted through such a mirror is given approximately by the formula $$T = 100\left[1 - \frac{2d}{\lambda_2} ln_e \frac{d}{\pi g}\right] \qquad (2)$$

In this formula the term $\lambda_2$ represents the wavelength of the microwave radiation. This formula holds with a high degree of accuracy so long as $$\lambda_2 > d > g$$

In order to maintain a high transmission coefficient for microwave radiation, and a high reflection coefficient for infrared radiation, the four terms $\lambda_2$, $d$, $g$, and $\lambda_1$ are arranged in a diminishing series, thus $$\lambda_2 > d > g > \lambda_1$$

The gap width $g$ is established at a value which exceeds about $10\lambda_1$ and which is also large enough to exclude the possibility of dielectric discharge across the gap for the intensity of microwaves to be encountered.

In a particular case, a gap width of 0.025 cm. was selected in order to minimize the possibility of dielectric breakdown in a microwave field of the radar system that was to be employed. Such a gap width is suitable to use, for example, with a microwave field in which the proper being emitted during the transmission period is less than about 2000 watts/cm.$^2$. In this case, a mirror was constructed in which the segment spacing $d$ was 0.25 cm. The mirror consisted of aluminum mirror segments deposited on a glass base. For this mirror the infrared reflection coefficient of the mirror was about 90%, while the microwave transmission coefficient of the mirror was about 80%. In this particular case the following ratios existed:

$$D/\lambda_2 > 10 \quad (3)$$

$$\frac{\lambda_2}{d} > 10 \quad (4)$$

$$\frac{d}{g} = 10 \quad (5)$$

$$\frac{g}{\lambda_1} > 10 \quad (6)$$

It is to be noted that the last three ratios are about equal to or greater than 10. Furthermore, the ratio of the diameter $D$ of the reflector 14 to the wavelength of the microwaves should also be greater than about 10. Since the best operation of the device depends upon the maintenance of about those ratios, the dichroic mirror of this invention is particularly effective for the purposes of this invention so long as the ratio of the microwave to the infrared radiation is of the order of 1000 or more. At the very minimum, this ratio should not be less than about 100, since this would require that the three ratios of Equations 4, 5 and 6 be only slightly more than 3. As a practical lower limit, the ratio of the wavelengths $\lambda_2/\lambda_1$ should be no less than about 500, and for best results, the ratio should be greater than 1000. As a matter of fact, a gap width of about 0.025 cm., and a segment spacing of about 0.25 cm., is very nearly ideal for producing a dichroic mirror which will efficiently reflect infrared radiation having a wavelength of the order of $5\mu$, and for efficiently transmitting microwave radiation having a wavelength of the order of 3 cm.

Furthermore, when employing mirror segments of particular spacings, the strength of the microwave field in which the mirror may be employed is greatly increased by forming the mirrors with sharp boundaries. By a sharp boundary is meant one in which the thickness of the mirror at the edge adjacent the gap falls from the average thickness of the mirror to zero thickness in a distance which is very small compared with the gap width. Thus, the distance of thickness fall-off should be much less than about 1/20 of the gap width. In effect, a mirror of that characteristic is opaque from edge to edge. Furthermore, as pointed out above, in order to minimize the possibility of electric discharge across the gap, the corners of the mirror segments are rounded slightly. Another advantage of employing mirror segments that have sharp boundaries is that full use is made of the gap between segments. If for any reason the electrical conductive material extends for any substantial distance into the space intended to be the gap, the effective width of the gap $g$ is reduced, thus seriously reducing the transmission coefficient of the dichroic mirror in the microwave region.

Figure 7:
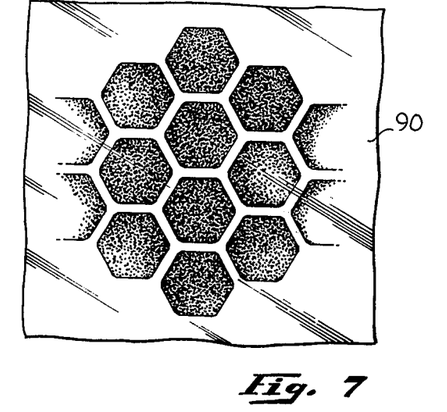
FIG. 7 is an enlarged fragmentary view of a transparent film employed in the production of a dichroic mirror in accordance with this invention.

The most effective method of manufacture of a dichroic mirror that is satisfactory for this invention which has been discovered so far involves the forming of the dichroic mirror by a photo-etching process. In carrying out this, in accordance with one method, a drawing of the mirror pattern is first made by drawing a pattern of the mirror array with black ink on a white card to an enlarged scale. The corners of the hexagons formed in this pattern are round to a radius that is a fraction of the gap distance. This pattern may be drawn either in positive form or in negative form. In the case where the pattern is drawn in a positive form, with the mirror segments shown in black, it may be photographed on positive photographic film to produce a transparency 90 of the mirror pattern. In the transparency shown in FIG. 7 the areas corresponding to the mirror segments are opaque, while the areas corresponding to the gaps between the mirror segments are clear. The positive pattern so formed may either be of the same scale, or at a different scale, from the scale of the final mirror pattern depending upon the method of printing that is employed.

Figure 8:
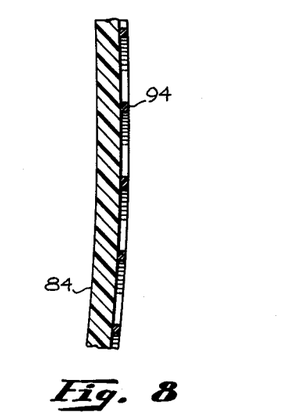
FIG. 8 is an enlarged cross-sectional view of the dichroic mirror during a stage of the manufacture of the mirror.
Figure 9:
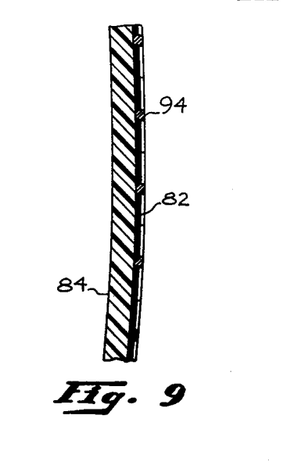
FIG. 9 is another cross-sectional view showing the mirror during an intermediate stage of its manufacture.

The glass base 84 upon which the mirror pattern is to be formed is cleaned and is then coated with a single coat of photo-resistive liquid such as that now marketed by Eastman Kodak Company under the trademark "Photo-Resist." This coating may be applied to the glass base with a fine brush. It is then allowed to dry. The film described above is then placed in close firm contact with the dried photo-resistive coating. In placing this negative pattern on the base 84, the emulsion side of the negative is placed next to the dried photo-resistive coating. Thereafter, light from a high intensity light source is projected through the negative pattern to the photo-resistive coating. Then the base 84, with the exposed photo-resistive coating, is immersed in a suitable developer, such as Eastman Kodak KPR developer. In the developing process, the unexposed parts of the photo-resistive coating are removed, leaving a grid of raised lines 94 in the form of photo-resistive coating material covering the clean glass except in the areas upon which the mirrors are to be formed, as shown in FIG. 8. After drying, aluminum is then evaporated onto the partially coated glass to a thickness of a fraction of the wavelength of the infrared radiation to be reflected and less than the height of the grid lines 94, thus forming the mirror segments 82, as shown in FIG. 9. The thickness is made great enough to render the resultant mirror segments substantially opaque from edge to edge. A thickness of about $1\mu$ is satisfactory in the case of aluminum. After the deposition of the coating has been completed, the aluminum coated unit is immersed in acetone and is swabbed lightly with cotton to remove the photo-resistive material and all aluminum that was deposited directly on it, forming the dichroic mirror of FIGS. 4 and 5.

Since the lines 94 of the mask are in intimate contact with the optical surface 86, the mirror segments 82 are of uniform thickness and have sharp boundaries. That is, the thickness of the deposit falls off abruptly at the boundary and no gradually tapering thin deposit of the mirror metal extends beyond the edges of the mirror surface into the area of the gaps. Since the segments are opaque, they possess the reflection characteristics of polished thick solid aluminum sheet.

As a result of the foregoing process, a dichroic mirror is formed in which the mirror segments have the desired size and spacing and in which the mirror segments have sharp boundaries and slightly rounded corners. The sharp boundaries are produced as a result of the photo-etching process employed. The rounded corners are produced by virtue of the original shaping of the pattern of black ink on the white card.

In an alternative process the photo-resistive image that is formed on the base 84 may be produced by projecting an image of the negative pattern optically onto the unexposed photo-resistive coating. However, this is not necessary, since a close fit between the pattern negative and the coated base 84 may be established by pre-shaping the negative film before it is placed on the coated glass base 84.

By forming a segmental mirror of the type described, a dichroic mirror is produced which has a high transmission coefficient for microwave radiation, and a high reflection coefficient for infrared radiation. Furthermore, the dichroic mirror so formed can be used in the presence of microwave fields of high intensity with little danger of electrical discharge occurring across the gaps between the mirror segments other than that which would occur due to the limitations of the dielectric strength of the material composing the mirror base 84 and the atmosphere itself. The effectiveness of such a mirror is to be contrasted with that which would occur if the segmental mirrors were formed by other processes which did not produce sharp boundaries at the edges that separate the segmental mirrors from the spaces between adjacent mirrors. The effectiveness of the mirror produced by the process described above is also enhanced by the fact that the corners of the mirrors are more blunt than the corners of squares and triangles, and are even rounded. More particularly, the adjacent edges of the mirror segments form large obtuse angles and are thus of a different character than right-angled or acute-angled corners.

By employing a dichroic mirror of the type described, very effective separation of microwave beams and infrared beams transmitted to the same area can be achieved. By employing such a mirror to separate the microwave beam from the infrared beam of a combined radar and infrared object detection system, a very effective and compact system is produced which employs both kinds of waves.

Figure 10:
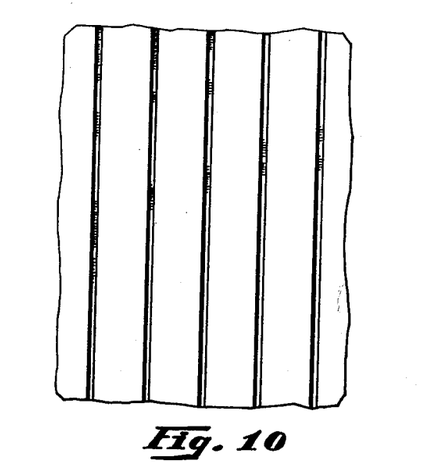
FIG. 10 is an enlarged fragmentary view of an alternate form of dichroic mirror.

In the embodiment of the invention illustrated above, a regular two-dimensional array of mirror segments has been employed in the dichroic mirror. This type of mirror is particularly effective when the microwave energy is depolarized. In cases, however, where plane polarized microwaves are employed, the mirror segments may be in the form of strips 96 that extend entirely across the face of the mirror as shown in FIG. 10. To attain efficient microwave transmission the spacing between centers of the strips and the widths of the gaps between them should be about the same as in the case of the mirror segment array. The transmission coefficient of microwave energy is high for a microwave field having an electric vector normal to the length of the strips, but is nearly zero for the component of the microwave field in which the electric vector is parallel to the lengths of the strips. For this reason, in case a dichroic mirror having such strips is employed, the mirror is oriented in the microwave field with the axes of the mirrors normal to the electric vector. However, to avoid the need for accurate alignment of the mirror with the electric vector, and also to take into account the fact that the microwave field may not be perfectly polarized, nor polarized in the same plane over its cross-section, and to take into account the fact that the plane of polarization may rotate or deviate from its normal position under certain conditions, a dichroic mirror employing a two-dimensional array of mirror segments, as described above, is most effective.

Though the invention has been described with particular reference to its use with infrared radiation, it will be understood that it may also be applied to the field of visible radiation. However, it is more effective when used in the infrared radiation region, since objects can often be detected at greater distances with infrared radiation than with visible radiation. In any event, the light radiation which is employed is of very short wavelength compared with that of the microwave radiation. Furthermore, though the invention has been described with reference to a system which is passive in the infrared radiation region, and is active in the centimeter wavelength region, it will be understood that it may also be applied to combined systems which are active in the infrared region or which are passive in the centimeter wavelength region.

Though the invention has been described above only with particular reference to certain specific applications and embodiments thereof, it will be understood that the invention may be embodied in many other forms. It is therefore to be understood that the invention is not limited to the specific embodiments thereof which have been described above, but that various changes which will now suggest themselves to those skilled in the art may be made in the material, configuration, details of construction, arrangement of the elements, and applications thereof, without departing from the invention as defined by the appended claims.

The embodiments of the invention in which an exclusive property or privilege is claimed are defined as follows:

1. A mirror member for separating short wavelength radiation and microwave radiation that is transmitted along a common axis through the same area, said mirror member comprising a dielectric base member having at least one optically smooth surface thereon, said base member being transparent to such microwave radiation, said base member having a two-dimensional array of mutually spaced hexagonal mirror segments bonded to said optical surface, said segments having sharp boundaries at their edges and being separated by insulating gaps; said mirror segments being composed of a material that possesses a high reflection coefficient for said short wavelength region; the lineal dimensions of said mirror segments being large compared with the wavelength of said short wavelength radiation and small compared with the wavelength of said microwave radiation, the widths of the gaps between adjacent mirror segments being small compared with the lineal dimensions of said segments but large compared with the wavelength of said short wavelength radiation, whereby a large percentage of the microwave radiation incident upon said mirror means is transmitted therethrough, and whereby a large percentage of said short wavelength radiation incident upon said mirror member is reflected therefrom.

2. A mirror member for separating short wave-length radiation and microwave radiation that is transmitted along a common axis through the same area, said mirror member comprising a dielectric base member having at least one optically smooth surface thereon, said base member being transparent to such microwave radiation, said base member having a plurality of mutually spaced and mutually insulated mirror segments on said optical surface, said segments having sharp boundaries at their edges and being free from sharp corners, said mirror segments being separated by insulating gaps, said mirror segments being composed of a material that possesses a reflection coefficient greater than 50 percent for said short wavelength region; the widths of said mirror segments being large compared with the wavelength of said short wavelength radiation and small compared with the wavelength of said microwave radiation, the widths of the gaps between adjacent mirror segments being small compared with the lineal dimensions of said segments but large compared with the wavelength of said short wavelength radiation, whereby a large percentage of the microwave radiation incident upon said mirror means is transmitted therethrough, and whereby a large percentage of said short wavelength radiation incident upon said mirror member is reflected therefrom.

3. A dichroic mirror for separating short wavelength radiation and microwave radiation that is transmitted along a common axis through the same area, said mirror comprising a dielectric base member having at least one optically smooth surface thereon, said base member having a plurality of mutually spaced mirror segments bonded to said optical surface, said segments being opaque from edge to edge and being separated by insulating gaps; said mirror segments being composed of a material that possesses a reflection coefficient greater than 50 percent for said short wavelength radiation; the widths of said mirror segments being large compared with the wavelength of said short wavelength radiation and small compared with the wavelength of said microwave radiation, the widths of the gaps between adjacent mirror segments being small compared with the lineal dimensions of said segments but large compared with the wavelength of said short wavelength radiation, whereby a large percentage of the microwave radiation incident upon said mirror means is transmitted therethrough, and whereby a large percentage of said short wavelength radiation incident upon said mirror member is reflected therefrom.

4. A dichroic mirror for separating infrared radiation having a wavelength of the order of 5μ and microwave radiation having a wavelength of the order of 3 cm., that is transmitted along a common axis through the same area, said mirror comprising a dielectric base member having at least one optically smooth surface thereon, said base member having a plurality of mutually spaced mirror segments bonded to said optical surface, said segments being opaque from edge to edge and being separated by insulating gaps; said mirror segments being composed of a material that possesses a reflection coefficient of approximately 80 percent for said infrared radiation; said mirror segments being spaced apart about 0.25 cm. between centers, the widths of the gaps between adjacent mirror segments being about 0.025 cm., whereby said dichroic mirror has a high transmission coefficient for a component of microwave radiation having an electric vector that is normal to the edges of said gaps, and whereby said dichroic mirror has a large reflection coefficient for such infrared radiation.

5. A dichroic mirror for separating infrared radiation having a wavelength of the order of 5μ and microwave radiation having a wavelength of the order of 3 cm., that is transmitted along a common axis through the same area, said mirror comprising a dielectric base member having at least one optically smooth surface thereon, said base member having a two-dimensional array of mutually spaced mirror segments bonded to said optical surface, said segments being opaque from edge to edge and being separated by insulating gaps; said mirror segments being composed of a material that possesses a reflection coefficient of approximately 80 percent for said infrared radiation; said mirror segments being spaced apart about 0.25 cm. between centers, the widths of the gaps between adjacent mirror segments being about 0.025 cm., whereby said dichroic mirror has a high transmission coefficient for such microwave radiation, and whereby said dichroic mirror has a high reflection coefficient for such infrared radiation.

6. A mirror member for separating short wavelength radiation and microwave radiation that is transmitted along a common axis through the same area,
said mirror member comprising a dielectric base member having at least one optically smooth surface thereon, said base member being substantially transparent to such microwave radiation,
said base member having an array of mutually spaced mirror segments bonded to said optical surface,
said mirror segments being composed of a material that possesses a high reflection coefficient for said short wavelength radiation,
the lineal dimensions of said mirror segments being large compared with the wavelength of said short wavelength radiation and small compared with the wavelength of said microwave radiation,
the widths of the gaps between adjacent mirror segments being small compared with the lineal dimensions of said segments but large compared with the wavelength of said short wavelength radiation,
whereby a large percentage of the microwave radiation incident upon said mirror means is transmitted therethrough, and
whereby a large percentage of said short wavelength radiation incident upon said mirror member is reflected therefrom.

7. A mirror member for separating short wavelength radiation and microwave radiation that is transmitted along a common axis through the same area,
said mirror member comprising a dielectric base member having at least one optically smooth surface thereon,
said base member being transparent to such microwave radiation,
said base member having a two-dimensional array of mutually spaced mirror segments bonded to said optical surface, said segments having adjacent edges with obtuse angles therebetween, said mirror segments being composed of a material that possesses a high reflection coefficient for said short wavelength radiation,
the lineal dimensions of said mirror segments being large compared with the wavelength of said short wavelength radiation and small compared with the wavelength of said microwave radiation,
the width of the gaps between adjacent mirror segments being small compared with the lineal dimensions of said segments but large compared with the wavelength of said short wavelength radiation,
whereby a large percentage of the microwave radiation incident upon said mirror means is transmitted therethrough, and
whereby a large percentage of said short wavelength radiation incident upon said mirror member is reflected therefrom.

8. A mirror member for separating short wavelength radiation and microwave radiation that is transmitted along a common axis through the same area,
wherein a large percentage of the microwave radiation incident upon said mirror means is transmitted therethrough, and
wherein a large percentage of said short wavelength radiation incident upon said mirror member is reflected therefrom,
said mirror member comprising a dielectric base member having at least one optically smooth surface thereon,
said base member being transparent to such microwave radiation,
said base member having a two-dimensional array of mutually spaced mirror segments bonded to said optical surface,
said mirror segments being composed of a material that possesses a high reflection coefficient for said short wavelength radiation,
the lineal dimensions of said mirror segments being small compared with the wavelength of said microwave radiation and large compared with the width of gaps therebetween,
said segments being so spaced that the width of said gaps is large compared with the wavelength of said short wavelength radiation.

9. A mirror member for separating short wavelength radiation and microwave radiation that is transmitted along a common axis through the same area,
said mirror member comprising a dielectric base member having at least one optically smooth surface thereon,
said base member being transparent to such microwave radiation,
said base member having a two-dimensinal array of mutually spaced mirror segments bonded to said optical surface,
said mirror segments being composed of a material that possesses a high reflection coefficient for said short wavelength radiation,
wherein the following relationships occur between the wavelengths of the microwave and short wavelength radiation, the size of the mirror member, the size of the mirror segments, and the width of the gaps therebetween:

$$D/\lambda_2 > 10$$
$$\lambda_2/d > 10$$
$$d/g \cong 10$$
$$G/\lambda_1 > 10$$

where
- $D$ = diameter of mirror member
- $\lambda_2$ = wavelength of microwave radiation
- $d$ = lineal dimensions of mirror segments
- $g$ = width of gaps between segments, and
- $\lambda_1$ = wavelength of short wavelength radiation, whereby a large percentage of the microwave radiation incident upon said mirror means is transmitted therethrough, and whereby a large percentage of said short wavelength radiation incident upon said mirror member is reflected therefrom.

References Cited in the file of this patent

UNITED STATES PATENTS

| | | | |
|---|---|---|---|
| 2,559,389 | Beeber et al. | July 3, | 1951 |
| 2,579,324 | Kock | Dec. 18, | 1951 |
| 2,636,125 | Southworth | Apr. 21, | 1953 |
| 2,700,323 | Schroder | Jan. 25, | 1955 |
| 2,826,956 | Simmons | Mar. 18, | 1958 |
| 2,842,760 | McLucas | July 8, | 1958 |
| 2,870,444 | Broussaud | Jan. 20, | 1959 |
| 2,895,127 | Padgett | July 14, | 1959 |
| 2,972,743 | Svensson et al. | Feb. 21, | 1961 |
| 3,025,515 | Fairbanks | Mar. 13, | 1962 |

OTHER REFERENCES

"Microwave Transmission Circuits," by Ragan, M.I.T. Rad. Lab. Series, vol. 9, 1948, page 234–5.

UNITED STATES PATENT OFFICE
CERTIFICATE OF CORRECTION

Patent No. 3,165,749　　　　　　　　　　　　　　January 12, 1965

Stanton H. Cushner

It is hereby certified that error appears in the above numbered patent requiring correction and that the said Letters Patent should read as corrected below.

Column 1, line 49, for "to", second occurrence, read -- of --; column 2, line 1, after "target" insert -- and --; column 7, line 14, for "proper" read -- power --.

Signed and sealed this 8th day of February 1966.

(SEAL)
Attest:

ERNEST W. SWIDER　　　　　　　　　　　　　　EDWARD J. BRENNER
Attesting Officer　　　　　　　　　　　　　　Commissioner of Patents